Aug. 30, 1932. H. W. TURNER 1,874,722
ELECTRICAL COIL AND PROCESS FOR MAKING THE SAME
Filed Sept. 18, 1931

Inventor:
Harry W. Turner,
by Chas. E. Tullar
His Attorney.

Patented Aug. 30, 1932

1,874,722

UNITED STATES PATENT OFFICE

HARRY W. TURNER, OF SCHENECTADY, NEW YORK, ASSIGNOR TO GENERAL ELECTRIC COMPANY, A CORPORATION OF NEW YORK

ELECTRICAL COIL AND PROCESS FOR MAKING THE SAME

Application filed September 18, 1931. Serial No. 563,681.

The present invention relates to an electrical coil and process for making the same.

The principal object of the invention is to produce at low cost a compact electrical coil of high dielectric strength and which is waterproof and resistant to relatively high temperatures.

For a consideration of what is believed to be novel and the invention attention is directed to the following specification and the claims appended thereto.

In the accompanying drawing forming part of the present application,

In carrying the invention into practice suitable conductors, for example, copper wires 1, are first provided in any suitable manner with a film of insulation 2 in the form of enamel. The enamel may be put on the copper wire by running it through an enameling machine in a manner well known in the art. Usually multiple films of oil combinations, such as linseed oil, China-wood oil, kerosene oil combinations, and the like, are baked on the copper wire at a relatively high temperature, for example, approximately 342° C., which produces the highest dielectric in volts per mil with the smallest insulation space factor. Such enamel will withstand exceptionally high temperatures when incorporated into the coil structure.

Figure 1:
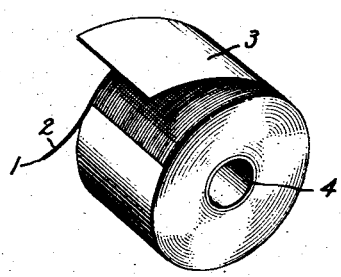
Fig. 1 is a view in perspective showing the first step in making the coil of the invention.
Figure 2:
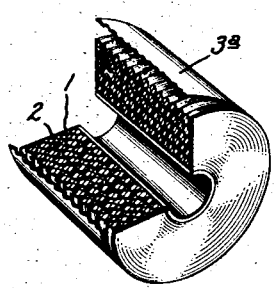
Fig. 2 is a view similar to Fig. 1 but broken away for the sake of clearness and showing the coil after heat treatment.
Figure 3:
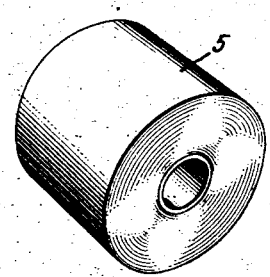
Fig. 3 is a view in perspective showing a completed coil.

The enameled wires are then wound on a suitable core 4, each layer of conductors being separated by a thin sheet of a cellulose ester 3, such as cellulose acetate, as the winding takes place. I prefer to use dry thin films of cellulose acetate whose thickness is approximately 1 mil as the layer insulation for the enameled wire for reasons more fully pointed out hereinafter. After the coil is wound with the dry thin films of cellulose acetate between each layer of enameled wires the coil is heated at about 150° C., usually between the range of 150 to 190° C., in any suitable manner. This heating causes the layer insulation of cellulose acetate to soften, swell, and shrink as shown diagrammatically in Fig. 2 wherein a layer of cellulose ester 3a has been shown spaced from a layer of wires to more clearly illustrate the effect of the heat treatment thereon. At this high temperature the convolutions of enameled copper wire are also caused at the same time to expand. Likewise, the air confined within the structure of the coil thus becomes rarefied. The concurrent softening, swelling, and shrinking of the films of cellulose acetate together with the expanding action produced by high temperature on the enameled copper wire convolutions automatically causes all components to realign themselves into a more densely compact solid coil structure.

When the coil is at its maximum high temperature it is immediately submerged in a bath of suitable insulating varnish maintained at room temperature, preferably a varnish formed from a resin of the alkyd type. The coil is allowed to cool in the bath to room temperature. It is then removed from the bath and after draining, the coil position is reversed and then baked dry at 150° C. or higher, a temperature range of 150–190° C. being satisfactory. Instead of baking the coil the varnish thereon may be allowed to harden in the air. The baking treatment, of course, results in a much harder film of resin. When a resin of the alkyd type is employed as the impregnating and coating means either an air hardening or a baking resin may be used. The means of baking the coil is optional. Any suitable means, for example an electrically heated oven, may be employed. In some cases it has been found advantageous to employ a high frequency field as a source of heat in which case the coil is introduced into said field for a very short period of time.

The varnish treatment results in a filling of the voids in the interior of the coil and covers all surfaces thereof preserving the coil against atmospheric and other undermining influences.

The above method results in the production of a coil 5 which is not only compact in nature but by virtue of the operations which have been performed on it is rendered practically free from voids in the interior and is externally protected by means of a film resistant to atmospheric and other influences. The use of cellulose acetate in the form of dry thin films makes possible the reduction in size of the resulting coil and imparts thereto high dielectric strength. Further, the peculiar property which cellulose acetate has of softening, swelling, and shrinking when heated is taken full advantage of in the present process in producing a coil which has maximum dielectric strength with minimum space factor and in which voids are reduced to a practical minimum. It is to be observed that the structure of the coil produced in accordance with the invention is such that there is entirely absent therefrom fibrous or absorbent insulating materials such as are present in ordinary coil structures which are insulated, for example, by means of such insulation as cotton and asbestos threads. In the present construction insulating materials employed are all of the film variety which not only results in a more compact structure but in a coil of high dielectric strength.

Coils constructed in accordance with the present invention are especially adapted for use as magnet coils, contactor coils, relay coils, solenoid coils, meter coils, transformer coils, field coils, and the like.

What I claim as new and desire to secure by Letters Patent of the United States, is:

1. An electrical coil comprising a core and insulated conductors wound in layers on said core, said insulated conductors being separated between layers by films of cellulose ester tightly shrunk around said conductors, the entire coil being impregnated and coated with an insulating varnish hardened thereon.

2. An electrical coil comprising a core and enameled conductors wound in layers on said core, said conductors being separated between layers by films of cellulose acetate tightly shrunk around said conductors, the entire coil being impregnated and coated with a resin of the alkyd type.

3. The process of making an electrical coil which comprises winding insulated conductors on a core, separating each layer of conductors with a sheet of cellulose ester, heating the wound coil to a temperature sufficient to expand the conductors and simultaneously cause the cellulose ester to soften, swell, and shrink around said conductors, submerging the coil while so heated in a bath of insulating varnish maintained at room temperature, allowing the coil to cool to room temperature in said bath, removing the coil from the bath, and hardening the varnish thereon.

4. The process of making an electrical coil which comprises winding enameled conductors on a core, separating each layer of conductors by a thin dry film of cellulose acetate as the winding takes place, heating the wound coil between 150 and 190° C. to cause said cellulose acetate to soften, swell, and shrink around said conductors, submerging the heated coil in a bath of alkyd resin varnish, allowing the coil to cool to room temperature in said bath, and baking said coil upon removal from said bath to harden said resin thereon.

In witness whereof, I have hereto set my hand.

HARRY W. TURNER.